United States Patent Office 3,415,288
Patented Dec. 10, 1968

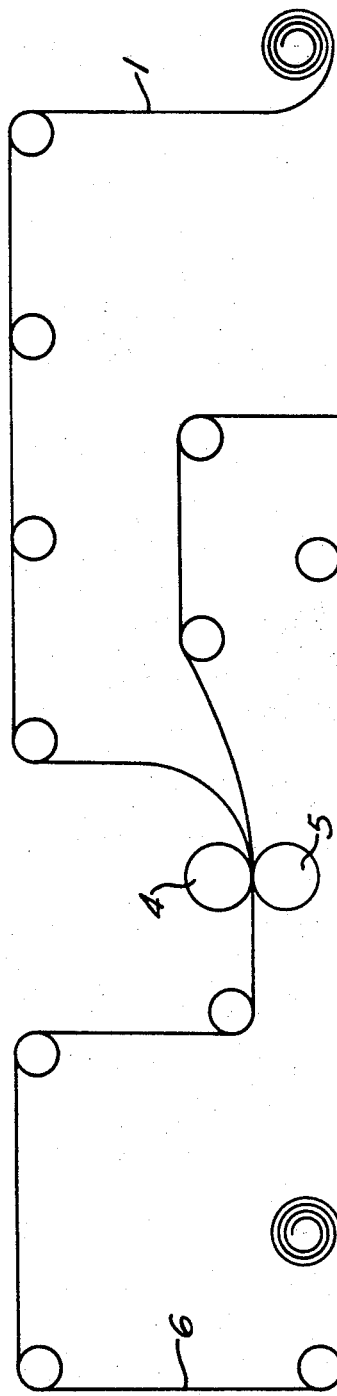
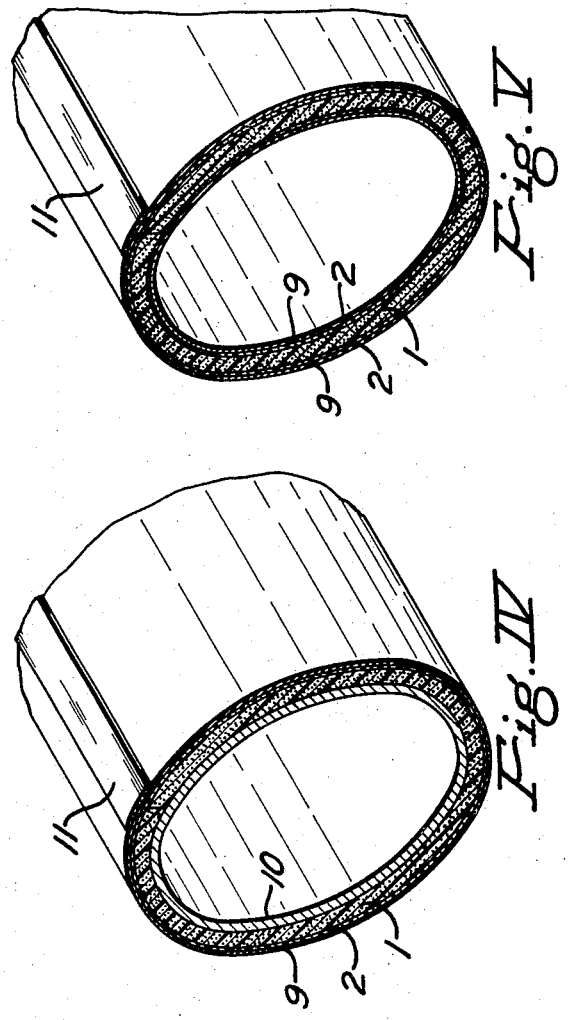
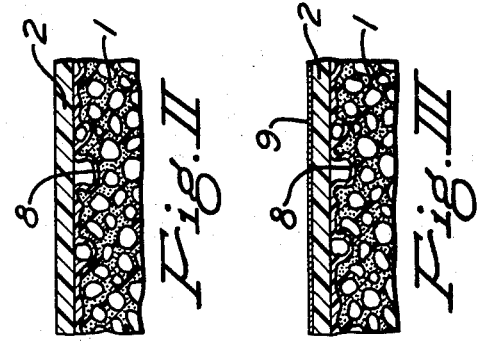
INVENTOR.
IRVING L. MARSHACK
BY
ATTORNEY.

3,415,288
HEAT INSULATED CONDUIT AND METHOD OF MAKING SAME
Irving L. Marshack, La Jolla, Calif., assignor to Califoam Corporation of America, Compton, Calif., a corporation of California
Continuation-in-part of application Ser. No. 396,490, Sept. 15, 1964. This application Dec. 27, 1966, Ser. No. 604,947
7 Claims. (Cl. 138—141)

ABSTRACT OF THE DISCLOSURE

A heat insulated conduit and method for preparing it by first heatsealing a polyurethane foam to self-sustaining thermoplastic film by interposing between the film and the foam a plastisol having dispersed therein a resin compatible with the film and heating the resulting assembly until the resin in the plastisol is fused and pressed into the pores on the surface of the foam while avoiding substantial distortion of the film and second, adhering a metalized thermoplastic film directly onto the film heatsealed to the foam. The resulting laminate is then either shaped into a conduit or wrapped about a conduit.

---

This invention relates to insulating constructions and methods for their manufacture. More specifically, this invention relates to duct work and duct insulation and is a continuation-in-part of my co-pending application Ser. No. 396,490, filed Sept. 15, 1964.

The search for light yet strong and cheap insulation which is easily manufactured and resistant to common wear and tear has long been carried on. Some materials which had possibilities were found to be impractical because of their susceptibility to chemical exposure and weathernig. Other materials proposed have been found to be too susceptible to abrasion, punctures, scratches, snags and, generally, the pressures of ordinary every day wear and tear. The materials which survived testing for general use were so difficult and expensive to fabricate that their mass production was clearly out of the question.

Some foam sheeting materials have been proposed for use in insulation including, for example, polyurethane foams; however, such materials alone do not possess a sufficiently dense, impervious and reflective surface for such applications, particularly when duct work is being fabricated. It has therefore been impractical and indeed, in many cases, impossible to employ polyurethane foam materials in such uses since the satisfactory application of some additional surface densifying materials has proven very difficult if not impossible to achieve. The porous surface of a polyurethane foam is not amenable to being sealed to some densifying material such as, for example, a thermoplastic film. U.S. Patent 2,759,475 suggests that films can be glued to a polyurethane foam, but no suitable glue is disclosed. Another proposal would have the manufacturer form the foam in situ between layers of thermoplastic film to produce a seal between film and foam. This process is not entirely suitable for continuous production because of the difficulty in satisfactorily forming the foam between the two self-sustaining resinous films. Apparently because of such difficulties and because polyurethane foam is not amenable to conventional techniques for laminating resinous webs together, it has been proposed to coat the surface of the foam with a plastisol and cure the plastisol to form a coating on the foam. Such a process does not produce a surface which is satisfactory for many purposes, particularly where a uniform, decorative or highly reflective and dense surface is required.

U.S. Patents 2,979,836 and 3,026,333 have disclosed that a thermoplastic film can be heatsealed to the surface of a polyurethane foam by pressing the assembly with a preheated electronic die while passing high frequency current through the die. This process is not suitable for making polyurethane foam suitable for insulation including duct work because the foam is only sealed to the film adjacent to the die surface.

Notwithstanding the foregoing, however, simply laminating a thermoplastic film of some kind to the surface of a polyurethane foam sheet does not, by itself, give the foam a surface which is sufficiently dense and impervious to permit the foam to serve as insulation, particularly for duct work. More is required before the polyurethane foam material can answer the demands made on insulation in general and duct work in particular in its every day use. The necessary thermal qualities as well as the strength and reflectivity required are still not achieved.

It is therefore an object of this invention to provide a construction and a method for making construction which is devoid of the foregoing disadvantages.

Another object of this invention is to provide a cellular polyurethane material having a highly dense and impervious surface which possesses many properties desirable for insulation in general and for duct work in particular.

Still another object of this invention is to provide a construction suitable for use as duct work which is strong, cheap, thermal and light as well as reflective, resistant to abrasions, punctures, scratches, snags, weathering, chemical exposure and the like.

A further object of this invention is to provide a method for preparing a cellular polyurethane material having a highly dense and impervious surface which is easy, efficient and inexpensive to carry out on a production basis.

Other objects will become apparent from the following description with reference to the accompanying drawing in which:

FIGURE I illustrates an apparatus suitable for use in practicing one embodiment of the first and second steps of this invention;

FIGURE II is an enlarged fragmentary section obtained in an embodiment of the invention after the first step has been completed;

FIGURE III is an enlarged fragmentary section obtained in an embodiment of the invention after the second step has been completed; and FIGURES IV and V illustrate the duct work obtained in various preferred embodiments of the invention.

The foregoing objects and others are accomplished in accordance with this invention, generally speaking, by providing an article of manufacture and a method for making it wherein a sheet of flexible polyurethane foam is heatsealed to a thermoplastic film in a first step by interposing between a self-sustaining thermoplastic film and the surface of a polyurethane foam sheet a plastisol having a thermoplastic resin dispersed therein and heating the resulting assembly to a temperature at which the resin in the plastisol is fused, but below the temperature at which substantial distortion of the self-sustaining thermoplastic film will occur, while pressing the thermoplastic film firmly against the surface of the polyurethane foam and in a second step, adhering metalized thermoplastic film directly onto the film heatsealed to the foam in the first step.

In the preparation of insulation, for example, for use in the walls, rafters, ceilings or in general in the construction of any type of home or building and for the preparation of insulation for duct work wherein the construction prepared by the method of this invention is to be used in conjunction with a support or substrate of some type such as a wall or pipe, only one side of a thermoplastic sheet need be treated in the method outlined above. In such cases, the porous surface of the sheet opposite to the side treated in accordance with the method of this invention may, for example, have a sheet of adhesified paper or any other suitable material adhered to it which upon being removed from the surface will expose an adhesified porous foam surface which may be adhered to any suitable support such as a wall or pipe, for example. On the other hand, the surface opposite that which is treated in accordance with the method of this invention may simply be allowed to remain a porous foam surface and may be subsequently applied with any suitable adhesive such as, for example, shellac or a resin adhesive or any suitable glue or other adhering agent dictated by economics to be the most practical. The adhesive may be applied by any suitable method such as, for example, by coating the surfaces of the foam and the support to which it is to be applied with a brush or spray or in any other suitable manner.

On the other hand where the construction of this invention is to be used as a self-supporting entity without any other support or substrate, then both sides of the sheet of polyurethane foam are preferably treated as outlined in the method of this invention. In the preparation of duct work, for example, both sides of the sheet of polyurethane foam may be treated in accordance with the method of this invention and then formed into any suitable shape which may be required for the duct work construction.

Any suitable type of polyurethane foam may be treated according to the method of this invention to yield the construction of this invention. Flexible as well as rigid foams may be used and all gradations therebetween are also suitable. Preferably, however, a flexible or semi-flexible polyurethane foam is used.

The product of the first step of the invention is, by itself, not as well suited for use as duct work and general insulation applications as the product of the second step since it lacks the strength, reflectivity and thermal properties of the product of the second step. Further, it does not possess a surface which is as strong, dense and impervious as that of the product of the second step. It is highly unexpected that the lamination of a metalized thermoplastic film having a thickness of only about one-half to about two mils onto the construction prepared in the first step can impart to a polyurethane foam the necessary properties and characteristics which make it highly advantageous and especially suitable for use in insulation in general and duct work in particular. For example, by means of the process of this invention, polyurethane foam can be made inexpensively and easily and the laminate which results has excellent thermal properties as well as great strength and reflectivity. The construction is abrasion resistant, puncture resistant, scratch, snag and score resistant; it has a high degree of resistance to chemical exposure and weathering and in general bears up superlatively under the demands of every day use. Not only does the construction of this invention possess all of these desirable properties, but it is light and inexpensive to prepare in a uniformly strong and securely laminated structure which may be used in any general insulation application instead of the materials traditionally employed.

In a preferred embodiment of this invention, the first step is carried out by coating a continuous sheet of thermoplastic film with a plastisol having a thermoplastic resin dispersed therein and assembling the coated film with a sheet of polyurethane foam so that the plastisol is interposed between coextensive surfaces of the thermoplastic film and the polyurethane foam. This assembly is then passed between the nip of a heated calender roll and a roll exerting pressure thereagainst. The temperature and speed of the calender roll is controlled so that fusion of the resin in the plastisol occurs but no substantial distortion of the self-sustaining thermoplastic film takes place. The roll cooperating with the calender roll is provided with a means for varying its pressure against the calender roll in order that the laminate passing between the nip of the rolls is firmly pressed while the resin in the plastisol is in the fused state. This insures penetration of the pores in the surface of the foam by the fused resin, thereby providing a substantially continuous surface on the foam which is coextensive with the surface of the thermoplastic film. Immediately after passing from the nip between the pressure roll and heated calender roll, the assembly springs back to substantially the same thickness it had when it entered the nip between the rolls.

The second step of this invention is preferably carried out in the same manner as the first step of the invention. For example, a continuous sheet of a metalized thermoplastic film is coated with a plastisol having a thermoplastic resin dispersed therein and assembled with the laminate prepared in the first step of this invention so that the plastisol is interposed between the coextensive surfaces of the metallized film and the self-sustaining film laminated to the surface of the polyurethane foam. This assembly is then passed between the nip of a heated calender roll and a roll exerting pressure thereagainst. The temperature and speed of the calender roll is controlled so that fusion of the resin in the plastisol occurs but no substantial distortion of the metalized thermoplastic film or the underlying self-sustaining film applied in the first step takes place. The roll cooperating with the calender roll is provided with a means for varying its pressure against the calender roll in order that the laminate passing between the nip of the rolls is firmly pressed while the resin in the plastisol is in the fused state. This insures a secure lamination between the product of the first step of the invention and the metalized thermoplastic film and provides a substantially continuous, highly reflective, dense and impervious as well as a very strong surface on the foam coextensive with the surface of the metalized thermoplastic film. The product obtained is in the nature of an armor-plated foam. The laminated surface of the foam provides a vapor and thermal barrier which also deflects ultraviolet radiation and gives the construction a strength and integrity which renders it temperature resistant and electricity resistant and gives it a high dielectric and tensile strength as well as a great degree of reflectivity and a highly polished appearance.

The heated roll or calender roll can be heated by any convenient means, such as, for example, by pumping heated oil or any other suitable liquid therethrough. Means should be provided for adjusting the pressure on the cooperating roll in order to control the amount of compression of the assembly as it passes through the nip between the rolls. The resulting laminate is preferably permitted to cool below the temperature of the roll and is then rolled for storage or can be used immediately.

The metalized thermoplastic film may also be adhered to the laminate prepared in the first step of this invention by any other suitable method using any other suitable adhesive material. For example, the metalized thermoplastic film may be adhered to the laminate prepared in the first step of the instant invention by simply painting or spraying some adhesive or shellac or glue or any other suitable adhering material to the self-sustaining film laminated to the surface of the polyurethane foam in the first step of this invention. Any suitable adhesive or glue or any other suitable adhering material may be used which economics dictate to be the most practcial.

In a preferred embodiment of the invention, duct work is prepared by heatsealing a continuous self-sustaining thermoplastic film to one of the length by breadth as opposed to thickness surfaces of a continuous urethane foam sheet, the length and breadth dimensions of the sheet being substantially greater than the thickness; fusing a metalizing thermoplastic film to the heatsealed film; cooling the resulting laminate and wrapping the resulting laminate around the duct or pipe to be insulated in such a manner that the porous surface contacts the duct or pipe and the metalized thermoplastic surface is on the outside of the construction. The assembly thus obtained is then taped or bound in any suitable manner with any suitable materials. Preferably, however, commercial pressure sensitive tape is used to bind the construction. In addition, if desired, the construction may be wrapped with the traditional cloth used in binding duct work. Alternatively, however, the foam laminate may have an adhesive coating such as a pressure sensitive adhesive on the porous side of the laminate which may be used either alone or in conjunction with any other suitable expedient to effectively adhere the insulation construction of this invention to the duct work or pipe. Because it is necessary to conform the laminate of this invention to the shape of the duct or piping to be insulated, in this embodiment a flexible or semi-flexible polyurethane foam sheet is preferably used.

In another embodiment of the invention, the insulation construction may be used as duct work by itself, without the necessity for having some metal, plastic or other suitable material act as the conductor of heat around which the laminate is merely wrapped. In such cases the laminate itself forms the walls of a conduit adapted to conduct or transfer heat from one place to another. To form such structures from flexible or semiflexible foam, the foam sheeting is laminated on both sides with a continuous self-sustaining thermoplastic film to which a metalized thermoplastic film is adhered. The resulting construction is then shaped as desired; for example, it may be rolled into a hollow, cylindrical configuration and then taped with commercial pressure sensitive tape or any other suitable binding means for support and permanency of shape. In such embodiments, the highly reflective metalized surface of the foam on the inside of the conduit acts as an efficient conductor of heat from the heat source to the desired outlet. Further, because of the insulating properties of the laminate of this invention, substantially no heat loss takes place between the heat source and the outlet, and the construction may readily be employed as either temporary or permanent duct work wherever desired.

Duct work in accordance with this invention may also be prepared from rigid polyurethane foam wherein panels of polyurethane foam are prepared using the first and second steps of the method of the instant invention and the panels thus fabricated are then fashioned into a hollow rectangular, square or parallelogram type of configuration and bound with any suitable material such as, for example, commercial pressure sensitive tape for added support and permanency of shape. Such duct work can often be seen in residences, for example, wherein the hollow cylindrical type of duct work requires too much space to make it practical in the small areas between walls and between floors, for example; hence, it has been found that a rectangular configuration is much more suitable and such structures may also be prepared according to the process of the invention. In addition, in the preparation of cold air return ducts, for example, panels or sheets of the laminate of this invention may simply be nailed, stapled or otherwise attached to adjacent floor joists or rafters or any other suitable expedient to thus prepare a channel through which the cold air may be returned. Although the embodiments discussed in this paragraph have referred to laminates of rigid polyurethane foam, flexible polyurethane foam may also be used if desired and in some cases such constructions may even be preferable.

The insulation construction of this invention may be prepared and shaped into hollow sleeves or any other suitable configuration in production processes, which hollow sleeves are subsequently used to prepare insulated duct work, piipng or any other suitable insulated construction simply by using the laminated structure of this invention alone or by using it as a sleeve into which is inserted some other suitable support having substantially the same shape and dimensions as the sleeve thus prepared. In this manner, simple and efficient production processes may be carried out with a minimum of effort and a maximum of practicality.

Laminates of any suitable polyurethane foam and any suitable thermoplastic synthetic resin can be prepared in the first step of this invention, and all such laminates are broadly contemplated. For example, the thermoplastic film can be a polyvinyl chloride, polyamide, polyolefin such as polyethylene, polypropylene and the like, polyvinyl alcohol, polyethylene terephthalate, polycarbonate, polyvinyl acetate, copolymer of polyvinyl chloride and polyvinyl acetate, polyester, polyurethane, and the like, and preferably polyvinyl chloride is used. In all instances, the thermoplastic film is a self-sustaining film of variable thickness, but preferably having a thickness of from about 2 to about 10 mils or, in other words, from about 0.002 to about 0.010 inch.

The plastisol used to heatseal the self-sustaining film to the surface of a polyurethane foam may contain any suitable synthetic resin which can be fused without substantial distortion of the self-sustaining film and which is compatible therewith. For example, the plastisol or organosol can contain polyvinyl chloride, polyvinyl acetate, polyethylene terephthalate, copolymers of polyvinyl chloride and polyvinyl acetate, polymethyl methacrylate, polymethyl acrylate, butadiene acrylonitrile copolymer, polyvinyl acetals, and the like dispersed therein. The plastisol should also contain a suitable plasticizer or mixture of plasticizers, such as, for example, dibutylphthalate, dioctylphthalate, diisodecylphthalate, diisooctylphthalate, a chlorinated biphenyl, or a petroleum distillate having a high distillation range.

One adhesive composition which has been found particularly advantageous for sealing a self-sustaining polyvinyl chloride film to a polyurethane foam has a viscosity of about 1300 cps. This composition is a plastisol having dispersed therein a polyvinyl chloride which fuses at a temperature of about 250° to 300° F. and a plasticizer such as dioctylphthalate and a petroleum distillate having a distillation range from about 600° to about 700° F. The plastisol also contains an epoxidized oil and a metallic salt stabilizer such as barium laurate or a cadmium or zinc salt of a carboxylic acid. A mercaptide can also be used as a stabilizer. The viscosity during use will gradually increase and best results are obtained if it does not exceed about 6000 cps.

The polyurethane foam is preferably a flexible material which can be prepared by conventional methods, such as, for example, the method described in U.S. Patent Re. 24,514. The polyurethane foam can be a polyester-polyurethane foam, a polyether-polyurethane foam, a mixed polyester-polyether-polyurethane foam or any other suitable cellular polyurethane such as is described, for example, in U.S. Patents 3,054,757, 3,061,556, 3,067,148, 3,201,372 and the like. For best results the polyurethane foam should be either a polyether-polyurethane foam or a polyester-polyurethane foam having a compression deflection of from 20 to 40 pounds per fifty square inches of area at 25% deflection and a density of from about 1 to about 8 pounds per cubic foot. Suitable polyester-polyurethane foams can be made by the processes described in U.S. Patents 2,948,691, 3,094,495, 3,044,971, and the like.

In one preferred embodiment of the first step of the invention, a flexible polyether-polyurethane foam is used in combination with a self-sustaining polyvinyl chloride film which is adhesively bound to the foam by means of a polyvinyl chloride plastisol dispersion.

In the second step of the process of the instant invention, the laminate of the first step is assembled with a continuous sheet of a metalized thermoplastic film which is then adhered to the thermoplastic film heatsealed to the foam in the first step of the invention. The adhesion of the metalized sheet may be accomplished in any suitable manner as described herein, but preferably, the process of the first step is repeated by assembling the laminated surface prepared in the first step with a suitable metalized thermoplastic film and heatsealing the assembly with the described plastisol.

Any suitable metalized thermoplastic film may be employed in the second step of the invention. It is preferable, however, to use a metalized thermoplastic film having a thickness of from about 0.5 to 2 mils, and most preferably, from about 0.5 to about 1 mil. Generally, although it has been found that the thinner the film, the better the construction obtained, if the metalized film is too thin, that is, less than about 0.5 mil thick, it will shatter. Preferably the metalized film is applied so that it is coextensive with the film applied in the first step.

Any suitable thermoplastic film may be used in the preparation of the metallized thermoplastic film employed in the second step of the instant invention. The thickness of the thermoplastic film to be metalized should be substantially the same thickness as the metalized thermoplastic film desired since the metal coating is generally only of an infinitely small thickness which does not significantly change the thickness of the thermoplastic film being metalized. Some suitable thermoplastic films which may be employed in preparing the metalized thermoplastic film to be used in the second step of the invention are, for example, polyvinyl chloride, polyamides, polyolefins such as polyethylene and polypropylene, polybutadiene and the like; polyvinyl alcohol, polycarbonates, polyvinyl acetates, copolymers of polyvinyl chloride and polyacetate, polyesters such as, for example, polyethylene terephthalate, polyurethanes and the like. Preferably, however, polyethylene terephthalate is used since it possesses highly desirable physical properties and it cannot be torn without first cutting or ripping it from an edge.

The thermoplastic film may be metalized in any suitable manner. For example, the film may be coated with a metallic paint or pigments by simply brushing it onto the film or roll coating it or by any other suitable method. The metalized surface may also be produced by simply spraying the thermoplastic film with metallic particles or by vacuum metalizing processes or the like. Some such suitable processes which may be used in the preparation of the metalized plastic film are, for example, those disclosed in an article entitled Vacuum Metallizing by H. B. Hebble, Jr., published in Modern Plastics Encyclopedia, 1966, vol. 43/No. 1A, page 998 as well as in U.S. Patents 3,030,912, 2,405,662, 2,384,500 and the like. In such processes any suitable metal such as, for example, aluminum, tin, iron, titanium, vanadium, chromium, manganese, nickel, copper, zinc, lead, alloys of these metals such as chrome-nickel steels and the like which will impart a highly reflective surface to the thermoplastic film may be used, and some such products are commercially readily available. Generally only one surface of the thermoplastic film need be metalized since the high reflectivity thus obtained is transmitted through the film to the unmetalized surface with substantially the same intensity as that of the metalized surface itself. If desired, however, both surfaces of the thermoplastic sheeting may be metalized.

When preparing the laminate in the second step of the instant invention, it is preferred that the surface of the metalized plastic film which contacts the thermoplastic film previously heatsealed to the polyurethane foam is the surface to which the metallic particles have been applied. If both sides of the thermoplastic have been metalized, however, either side may be laminated to the thermoplastic film previously fused to the surface of the polyurethane foam. Alternatively, however, one may also laminate the metalized sheet to the construction obtained in the first step of this invention so that the unmetalized surface of the thermoplastic film is adhered to the thermoplastic sheet previously fused to the ployurethane foam. In such a case it is preferred that if the process of step one is repeated, the resin in the plastisol should be compatible with the film surface. However, in either case, any suitable adhesive may be used to prepare the laminate of the second step if desired, without regard to its compatibility with the metalized thermoplastic sheet.

Referring now to the drawing, FIGURE I illustrates diagrammatically an apparatus suitable for carrying out the first and second steps of this invention. A continuous web of polyurethane foam 1 and a continuous self-sustaining polyvinyl chloride film 2 are provided. The film 2 is roller coated in container 7 with a plastisol dispersion of polyvinyl chloride 8. Webs 1 and 2 pass between rolls 4 and 5. Roll 5 is heated and roll 4 presses webs 1 and 2 firmly against the heated surface of roll 5, thereby insuring penetration of the pores on the surface of the foam by the plastisol. The temperature of roll 5 is such that the resin in the plastisol fuses and securely seals thermoplastic film 2 to the surface of the polyurethane foam web without substantial distortion of film 2. The laminate 6 is then passed over a plurality of idler rolls to permit cooling of the laminate before it is rolled for storage or for treatment in accordance with the second step of this invention.

The plastisol used in the foregoing embodiment described with reference to the drawing has the following composition, all parts being given by weight:

100 parts polyvinyl chloride, fusion point 250° to 300° F.
50 parts dioctylphthalate
20 parts of petroleum distillate having a distillation of 600° to 675° F.
5 parts epoxidized oil
3 parts barium laurate.

It has been found most advantageous in the first step to use a resin in the plastisol which has the same chemical composition as that of the self-sustaining thermoplastic film. However, the resin used in the plastisol may also be a lower polymeric material which is compatible with the resin of the self-sustaining film and should have a lower fusion point. During the heating process, further polymerization occurs and the self-sustaining film becomes bound to the surface of the polyurethane foam. By providing the plastisol as an intermediate layer between the self-sustaining film and the polyurethane foam, substantially continuous coextensive resinous surfaces are available. As illustrated in FIGURE II, the plastisol 8 coats the surface and is forced into the pores of the foam 1. The resin in the pores serves as anchors for the film formed from the plastisol and assists in the production of a laminate which resists being pulled apart to a point where the foam is usually torn first. In order to insure proper adhesion, the assembly of foam, self-sustaining film, and plastisol should be pressed firmly against the heated surface. For best results, the amount of pressure should be sufficient to compress the assembly to not substantially more than about 25% of its original thickness. While it is preferred to use rollers of the type illustrated in the drawing in combination with continuous webs, the process of the invention can also be practiced with any other suitable apparatus such as, for example, heated platens or the like. It is important that the plastisol does not contain a substantial amount of a material which will volatize during the heatsealing process in order to avoid any bubbling which will cause the distortion of the resulting product.

The first step of the invention has been described in detail with respect to the lamination of a polyvinyl chloride film to a polyurethane foam, but it is to be understood that other self-sustaining thermoplastic films can be laminated to the foam in accordance with this invention and that it is only necessary to substitute one of the other self-sustaining films indicated as suitable herein for the polyvinyl chloride in the foregoing embodiment of the invention. As indicated hereinbefore, it is preferable but not absolutely necessary that the resin in the plastisol have the same general chemical composition as that of the self-sustaining thermoplastic film. In the event a different resin is to be used in the plastisol, it should be compatible with the resin forming the self-sustaining thermoplastic film and should have a fusion point below the distortion point of the self-sustaining film.

The temperature of the heated roll and the exposure time used to fuse the resin in the plastisol and thereby heatseal the self-sustaining film to the foam will vary with the resin and film used but will be such that the resin in the plastisol fuses during the exposure to the heated roll without substantial distortion of the self-sustaining film. With most plastisols and self-sustaining films, the temperature of the roll 5 will be from about 220° to about 350° F. The pressure used should be sufficient to reduce the thickness of the foam by at least about 75 percent and to insure proper wetting and penetration of the surface of the foam. A pressure of from about 25 to about 35 pounds per square inch will usually achieve this result. In the continuous apparatus of the drawing, the speed of the webs can be varied as long as the webs are adjacent to the heated roll long enough to heat the plastisol to create a fusion of the resin dispersed therein.

It is believed that the exceptionally strong bond resulting from this process is at least partially due to the intimate relationship of the foam and plastisol during the treatment. The plastisol is pressed or squeezed into the pores of the foam as it is compressed, and as compression continues and the pores are at least partially closed, the plastisol becomes entrapped therein. Upon solidification, then it serves as anchors extending into the pores on the surface of the foam.

In carrying out the second step of the instant invention the same apparatus as described in FIGURE I may be used. In the second step, however, the continuous web of polyurethane foam 1 is the laminated construction prepared in the first step of the invention and it is introduced into the apparatus in such a way as to insure that the laminated surface of the foam is facing the coated surface of film 2. Further, in the second step of the invention, the continuous self-sustaining film 2 is an aluminum metalized polyethylene terephthalate film prepared by a vacuum metalizing process. The polyethylene terephthalic film 2 is roller coated in container 7 with a plastisol dispersion of polyvinyl chloride 8. Webs 1 and 2 pass between rolls 4 and 5. Roll 5 is heated and roll 4 presses webs 1 and 2 firmly against the heated surface of roll 5, thereby insuring penetration of the pores on the surface of the foam by the plastisol. The temperature of roll 5 is such that the resin in the plastisol fuses and securely seals the metalized polyethylene terephthalate film 2 to the thermoplastic film previously laminated to the surface of the polyurethane foam web. The laminate 6 is then passed over a plurality of idler rollers to permit cooling of the laminate before it is rolled for storage or for subsequent shaping in preparing the insulation or duct work of this invention. The plastisol used in this embodiment of the second step of the invention is substantially the same as the plastisol composition used in the first step and described hereinabove.

In order to insure proper adhesion in this embodiment of the invention, the assembly of the foam laminate prepared in the first step of the invention, the metalized thermoplastic film and plastisol should be pressed firmly against the heated surface. For best results, the amount of pressure should be sufficient to compress the assembly to not substantially more than about 25% of the original thickness. While it is preferred to use rollers of the type illustrated in the drawing in combination with continuous webs, the process of the invention can also be practiced with any other suitable apparatus such as, for example, heated platens or the like. It is important that the plastisol does not contain a substantial amount of a material which will volatilize during the heatsealing process in order to avoid any bubbling which will cause the distortion of the resulting product.

As illustrated in FIGURE III, the metalized thermoplastic film 9 forms a coating on the surface of the laminate prepared in step 1 of the invention. Although the thickness of the metalized thermoplastic film in the laminate construction may be significantly less than that of the thermoplastic film adhered to the foam in the first step of the invention, the effect of the lamination of the metalized film to the construction is such that, in effect, an armor-plated foam sheeting is obtained. The construction of FIGURE III is strong and durable and is incapable of being stretched or sheared. It is even possible to beat upon the construction with a hammer and it will not break.

The second step of the invention has been described in detail with respect to the lamination of an aluminized polyethylene terephthalate film, but it is to be understood that any other suitable metal or metalizing material may be used in the preparation of the polyethylene terephthalate film and also that any other suitable self-sustaining thermoplastic film may be metalized and laminated to the foam in accordance with the second step of this invention. It is only necessary to substitute one of the other self-sustaining films indicated as suitable herein for the polyethylene terephthalate and any other suitable metal or metalizing expedient for the aluminum used in metalizing the polyethylene terephthalate film given as an example in the foregoing description.

The temperature of the heated roll and the exposure time used to fuse the resin in the plastisol in the foregoing description of the second step of the instant invention to heatseal the metalized thermoplastic film to the laminate prepared in the first step of the invention will vary with the resin and film used but will be such that the resin in the plastisol fuses during the exposure to the heated roller without substantial distortion of the film. With most plastisols and self-sustaining films, the temperature of the roll 5 will be from about 220° to about 350° F. The pressure used should be sufficient to reduce the thickness of the foam by at least about 75% and to insure proper wetting and lamination of the surface of the metalized thermoplastic film to the surface of the thermoplastic film previously heatsealed to the surface of the foam. A pressure of from about 25 to about 35 pounds per square inch will usually achieve this result. In the continuous apparatus of the drawing, the speed of the sheets or webs can be varied as long as the sheets or webs are adjacent to the heated roll long enough to heat the plastisol and create a fusion of the resin dispersed therein.

The second step of the invention may also be carried out using any other suitable apparatus and any other suitable adhering agent as desired. The only limitation in this regard is that a suitable adhesive is used to insure a secure bond between the metalized thermoplastic film and the thermoplastic film previously heatsealed to the surface of the foam in the method and/or apparatus being used to carry out the second step of the invention.

The laminate thus prepared can then be shaped or formed into any suitable configuration for use either alone or with some suitable support or substrate. For example, FIGURE IV illustrates one preferred embodiment of the invention wherein duct work is prepared from the laminated construction obtained in accordance with this invention by covering a galvanized tin duct with the laminate in such a manner that the porous surface of the laminate is in contact with the duct and the highly reflective dense and impervious laminated surface is exposed. In FIGURE IV the laminate is secured to a metal duct 10 by means of commercial pressure sensitive tape 11 which binds the seams of the laminate so that it forms a sleeve around the duct work. FIGURE V illustrates another preferred embodiment of the invention wherein both sides of the polyurethane foam sheet are laminated as described herein and a duct is formed which has a hollow conduit configuration and is self-sustaining. The duct formed is taped with commercial pressure sensitive tape 11 for added support and permanency of shape.

Although the figures illustrate the use of the laminate of this invention in preparing insulated duct work, it is to be understood that the laminate of the invention is eminently suitable in any application wherein insulation is required. For example, a laminate of this invention may be used in air conditioning a home or office building. It is strong, light and durable, weather and chemical resistant and may be substituted for any other insulating materials traditionally used such as, for example, fiber glass batting and the like. The laminate of this invention also imparts a high degree of sound proofing to those structures in which it is employed. Further, the process of this invention is applicable to the coating of polyurethane foam having a profiled surface in the preparation of the laminate. The resulting coating is adhered to both the hills and valleys of the profiled surface. For example, a cross-section of a profiled surface of the foam would represent a typical sine wave pattern as distinguished from a straight line. In this instance, the thermoplastic film coatings follow the contour of the hills and valleys of the profiled surface and are securely attached over the entire surface area.

The process of the invention is readily adapted to production processes wherein a hollow sleeve or other suitable configuration is fabricated from the laminate of the invention which is to be used later, for example, by simply sliding a conduit of the appropriate shape and dimension inside of it. Hence, the insulation can be prepared in standard sizes and fitted onto the structure to be insulated later.

In another variation of the invention, it is feasible to first laminate the metalized thermoplastic film to a self-sustaining sheet of a thermoplastic material and then laminate the composite structure to a polyurethane foam sheet. Any suitable method may be used for the initial lamination such as those described herein, for example.

Further, although the invention has been described in detail with reference to polyurethane foam sheeting, it is to be understood that any type of polyurethane foam surface may be treated in accordance with the invention and that it is thus not limited to the lamination of polyurethane foam sheets alone but encompasses blocks of foam and the like as well.

It is to be understood that any of the components and conditions mentioned as suitable herein can be substituted for its counterpart in the foregoing discussion.

What is claimed is:

1. A heat insulated conduit comprising walls having a polyurethane foam layer, a self-sustaining thermoplastic film adhered to the exterior surface of the foam by a cured plastisol layer compatible with said film and extending only into the pores on the surface of the foam, and a sheet of metallized thermoplastic film adhered to the first said thermoplasic film and substantially coextensive therewith, said metallized film forming the external surface of the conduit.

2. A hollow conduit having heat insulation thereabout said heat insulation comprising a laminate having a polyurethane foam core, a self-sustaining thermoplastic film adhered to the exterior surface of the foam core by a cured plastisol layer compatible with said film and extending only into the pores on the surface of the foam, and a sheet of metallized thermoplastic film adhered to the first said thermoplastic film and substantially coextensive therewith, said metallized film forming the external surface of the conduit.

3. The conduit of claim 2 having a sheet of metallized thermoplastic film adhered to both sides of the foam layer.

4. A method for making a heat insulated conduit which comprises interposing between a polyurethane foam and a self-sustaining thermoplastic film, a plastisol having a resin compatible with the film dispersed therein, pressing the resulting assembly between a heated roll and a roll which presses the assembly against the heated roll to force the plastisol into pores on the surface of the foam while fusing the resin in the plastisol, heatseal binding a metallized thermoplastic film on a surface of the thermoplastic film, and thereafter shaping the resulting laminate into a conduit having a hollow configuration with the metallized thermoplastic film forming the external surface of the conduit.

5. The method of claim 4 wherein the self-sustaining thermoplastic film is a self-sustaining polyvinyl chloride film, the resin in the plastisol is polyvinyl chloride and the metalized film is aluminized polyethylene terephthalate.

6. The method of claim 4 wherein continuous webs of foam and thermoplastic film are pressed between the said rolls and thereafter in a second step the metalized thermoplastic film is bound to the exposed surface of the self-sustaining thermoplastic film by a process which comprises interposing between said self-sustaining thermoplastic film and said metalized thermoplastic film a plastisol having a resin compatible with a first said film dispersed therein, heating and pressing the resulting assembly to fuse the resin in the plastisol, and thereafter cooling the fused resin below its fusion point.

7. The method of claim 4 wherein the laminate is shaped about a conduit and the laminate acts as insulation therefore.

References Cited

UNITED STATES PATENTS

| 3,009,601 | 11/1961 | Matsch | 161—113 |
| 3,170,832 | 2/1965 | Wilson et al. | 161—160 |
| 2,706,669 | 4/1955 | Plansoen et al. | 161—254 XR |
| 3,070,476 | 12/1962 | Miller. | |
| 3,257,263 | 6/1966 | Miller | 161—161 XR |
| 3,318,758 | 5/1967 | Tell | 161—216 |
| 3,061,460 | 10/1962 | Schickedanz | 117—98 |

FOREIGN PATENTS

| 821,537 | 10/1959 | Great Britain. |
| 955,285 | 4/1964 | Great Britain. |
| 958,966 | 5/1964 | Great Britain. |
| 1,329,849 | 4/1963 | France. |

ROBERT F. BURNETT, *Primary Examiner.*

R. H. CRISS, *Assistant Examiner.*

U.S. Cl. X.R.

161—160, 190, 254; 156—218, 308